United States Patent
Taillan et al.

(10) Patent No.: US 9,986,747 B2
(45) Date of Patent: Jun. 5, 2018

(54) PROCESS FOR THE PREPARATION OF STABLE AND HOMOGENEOUS FRUIT PREPARATION

(75) Inventors: Eric Taillan, Rixensart (BE);
Jean-Francois Pelletier, Hyeres (FR);
Christelle Lacorre, Etampes (FR);
Vanessa Gauthier, Le Plessis Robinson (FR)

(73) Assignee: COMPAGNIE GERVAIS DANONE, Paris (FR)

( * ) Notice: Subject to any disclaimer, the term of this patent is extended or adjusted under 35 U.S.C. 154(b) by 177 days.

(21) Appl. No.: 13/583,764

(22) PCT Filed: Mar. 12, 2010

(86) PCT No.: PCT/IB2010/001118
§ 371 (c)(1),
(2), (4) Date: Sep. 10, 2012

(87) PCT Pub. No.: WO2011/110892
PCT Pub. Date: Sep. 15, 2011

(65) Prior Publication Data
US 2013/0004648 A1 Jan. 3, 2013

(51) Int. Cl.
| | | |
|---|---|---|
| *A23B 7/08* | (2006.01) | |
| *A23B 7/005* | (2006.01) | |
| *A23B 7/02* | (2006.01) | |
| *A23L 19/00* | (2016.01) | |

(52) U.S. Cl.
CPC ............ *A23B 7/02* (2013.01); *A23B 7/005* (2013.01); *A23L 19/09* (2016.08)

(58) Field of Classification Search
CPC .......... A23L 1/2128; A23L 2/02; A23L 1/064; A23L 1/212; A23B 7/005; A23B 7/148; A23B 4/005
USPC ........................................ 426/639, 520, 660
See application file for complete search history.

(56) References Cited

U.S. PATENT DOCUMENTS

| | | | |
|---|---|---|---|
| 2,567,038 A * | 9/1951 | Stevens et al. | ................ 426/546 |
| 3,846,570 A | 11/1974 | Vetter et al. | |
| 5,879,737 A | 3/1999 | Ashourian | |
| 2010/0183793 A1 | 7/2010 | Noble et al. | |

FOREIGN PATENT DOCUMENTS

| | | | | |
|---|---|---|---|---|
| EP | 429966 A2 * | 6/1991 | | |
| FR | 2700245 A1 * | 7/1994 | ........... | A23L 1/2128 |
| FR | 2 917 948 A1 | 1/2009 | | |
| WO | 2004/049824 A1 | 6/2004 | | |
| WO | WO 2004049824 A1 * | 6/2004 | ..... | C12Y 301/01011 |

OTHER PUBLICATIONS

International Search Report, dated Oct. 7, 2010, from corresponding PCT application.

* cited by examiner

*Primary Examiner* — Jyoti Chawla
(74) *Attorney, Agent, or Firm* — Young & Thompson

(57) ABSTRACT

A process for preparing a stable and homogenous fruit preparation, includes the steps of:
(i) preparing a fruit mixture by mixing fruit pieces, optionally in the presence of a fruit matrix, with sugar in an amount included between 10% and 60% by weight relative to the total weight of the fruit preparation,
(ii) treating the fruit mixture obtained in step (i) at a temperature ranging between 40° C. and 90° C., and at a pressure from 50 mbar to 1000 mbar, during 15 to 90 minutes, so as to obtain a concentrated fruit preparation having a Brix degree at 20° C. ranging between 50° and 75°,
(iii) optionally submitting the concentrated fruit preparation to a heat treatment, at a temperature ranging between 90° C. and 120° C.,
(iv) cooling the concentrated fruit preparation obtained in step (ii) or, when step (iii) is performed, cooling the concentrated fruit preparation obtained in step (iii), to storage temperature.

10 Claims, No Drawings

PROCESS FOR THE PREPARATION OF STABLE AND HOMOGENEOUS FRUIT PREPARATION

The objective of the present invention is to provide a process for the preparation of a stable and homogenous fruit preparation.

Fruit preparations available on the market are usable as such or incorporated into final products, like dairy products. They generally comprise pieces of fruits, or a mixture of fruit puree with pieces of fruits. But these fruit preparations also comprise additives like starch and its derivatives, pectin, carraghenans, agar agar, or gums like guar gum or xanthan gum. These additives are used as thickening agents and/or gelling agents, because they confer a good texture and homogeneity to the preparation. Indeed, for example, when the fruit preparation is incorporated and mixed with the final product as a dairy product, the resulting mixture comprises pieces of fruits which are homogeneously distributed in said mixture. Such final mixtures, as well as the fruit preparations, are also easily pumped and potted, which is attractive from an industrial point of view.

This is because the thickening agents and/or gelling agents confer the required texture and viscosity to the fruit preparation, thus maintaining the fruit pieces in suspension into the product, and avoiding their sedimentation.

However, for regulatory reasons, and in order to avoid the presence of alimentary additives in the fruit preparations as far as possible, there is still a need to have fruit preparations comprising fruit pieces, said fruit pieces being homogeneously distributed in said fruit preparation, and this without using thickening agents and/or gelling agents. The present invention also leads to fruit preparations comprising fruit pieces, said fruit pieces having a good firmness. The viscosity of the fruit preparations also allows them to be pumped and potted, which is very interesting from an industrial point of view.

The inventors have surprisingly discovered that it is possible to elaborate a fruit preparation which is stable, i.e. does not present any sedimentation or floatation of the fruit pieces, without using any gelling agent and/or thickening agent. Such fruit preparations are obtainable thanks to the process according to the present invention.

The present invention thus refers to a process for the preparation of a stable and homogenous fruit preparation, which comprises the steps of:

(i) preparing a fruit mixture by mixing fruit pieces, optionally in the presence of a fruit matrix, with sugar, said sugar being in an amount comprised between 10% and 60% by weight relative of the total weight of the fruit preparation,
(ii) treating the fruit mixture obtained in step (i) at a temperature comprised between 40° C. and 90° C., preferably comprised between 50° C. and 70° C., preferably comprised between 60° C. and 65° C., and at a pressure from 50 mbar to 1000 mbar, preferably comprised between 90 mbar and 200 mbar, during 15 to 90 minutes, so as to obtain a concentrated fruit preparation, said concentrated fruit preparation having a Brix degree at 20° C. comprised between 50° and 75°,
(iii) optionally, submitting the concentrated fruit preparation obtained in step (ii) to a heat treatment, at a temperature comprised between 90° C. and 120° C., preferably comprised between 90° C. and 100° C.,
(iv) cooling the concentrated fruit preparation obtained in step (ii) or, when step (iii) is performed, cooling the concentrated fruit preparation obtained in step (iii), to a storage temperature.

The present invention also relates to a stable and homogenous fruit preparation obtainable by the process as described above.

The fruit preparation obtained thanks to the process according to the present invention does not contain any gelling agent and/or thickening agent in a sufficient amount to induce a viscosity or texture able to retain the fruit pieces in a homogeneous and stable suspension in said fruit preparation. Thus generally, the fruit preparation comprises less than 0.5% by weight relative to the weight of the fruit preparation of thickening agent and/or gelling agent, preferably less than 0.3% by weight, preferably less than 0.1% by weight, and preferably it is totally free of any thickening agent and gelling agent.

By gelling agent, it is meant a substance which, when added to a food product, increases its consistence thanks to the formation of a gel.

By thickening agent, it is meant a substance which, when added to a food product, increases its viscosity.

Examples of gelling agents and thickening agents are starch and its derivatives, pectin, carraghenans, agar agar, or gums like guar gum or xanthan gum.

The fruit preparation prepared according to the present invention is good in terms of texture, taste and overall quality.

The fruit preparation prepared by the process according to the invention is stable at room temperature without any adverse effects on the sensory attributes. Moreover, the fruit pieces have a good homogeneity in the fruit preparation, which allows a good repartition of the fruit pieces in the fruit preparation, so that the fruit preparation can be pumped.

The process according to the invention also preserves the natural integrity of the fruit and the fruit pieces firmness which is contributing to a better fruit recovering.

By homogeneous distribution, it is meant that the fruit pieces are uniformly dispersed (this uniform repartition being determinable with bare eye) in the fruit preparation. By stable homogeneous distribution, it is meant that the fruit pieces dispersion remains uniform in the fruit preparation, during at least 30 days, preferably at least 45 days, preferably at least 56 days, at a temperature between 3° C. and 30° C., preferably between 3° C. and 20° C. and preferably between 3° C. and 10° C.

Consequently, after at least 30 days, the rate of sedimentation of the fruit pieces in the bottom of the container is less than or equal to about 1% by weight of the total fruit pieces in the fruit preparation, and the rate of sedimentation of the fruit pieces floating on the top of the container is less than or equal to about 1% by weight of the total fruit pieces in the fruit preparation.

By fruit preparation, it is meant a food preparation comprising pieces of fruits. Such a fruit preparation can only consist of said pieces of fruits. The amount of fruit pieces is preferably between 20% and 70% by weight of the fruit preparation, preferably between 50 and 70% by weight, preferably 60% by weight of the fruit preparation.

In another embodiment, such fruit preparation comprises a fruit matrix, like fruit puree, concentrated fruit puree or fruit compote, in which pieces of fruits are added. In this latter case, the amount of fruit matrix can be between 2% and 70%, preferably between 30% and 50% by weight of the fruit preparation, in particular 40% by weight of the fruit preparation.

The fruits which can be used in the process according to the present invention are all kinds of fruits. Non limitative examples of fruits usable as fruit pieces and fruit matrix are strawberry, blackberry, apricot, peach, raspberry, blueberry, ananas, mango, banana, papaya, passion fruit, plum, pomelo, orange, kiwi, lemon, cherry, pear and apple. Preferably, the fruits have a natural endogenous pectin amount of around 0.8% and a total fibre amount of around 2%. The natural endogenous pectin amount and total fibre amount depend on the variety, geographic origin and maturity of the fruit.

Step (i) of the process according to the invention comprises the mixing of fruit pieces with sugar, optionally in the presence of a fruit matrix, so as to obtain a fruit mixture. Sugar can be cane sugar, beet sugar, palm sugar or sugar extracted from any vegetal. It can be liquid or in powder form; raw or refined. It can be selected from the group consisting of granulated sugar, icing sugar, raw sugar, brown sugar, fructose, saccharose, dextrose, glucose, inverted sugar syrup, glucose syrups and fructose syrups. Preferably, sugar is saccharose.

In addition to said sugar described above, the fruit mixture can also comprise intense sweeteners like stevioside, aspartame, acesulfame-K, saccharine, sucralose or cyclamates.

The amount of sugar is comprised between 10% and 60% by weight of the fruit preparation, preferably between 20 and 50% by weight, preferably between 35 and 45% by weight, preferably 40% by weight of the fruit preparation. Said sugar is meant according to the present invention as added sugar, and is not intended to comprise the sugar comprised in the fruit.

The amount of sugar is comprised between 30% and 80% by weight relative to the total weight of the fruit pieces and fruit matrix when present, preferably between 40 and 70% by weight, preferably between 50 and 65% by weight relative to the total weight of the fruit pieces and fruit matrix when present.

The fruit pieces preferably have a diameter between 1 and 30 mm, in particular 10 mm.

Depending on the water quantity of the fruit pieces, a small amount of water can be used in step (i), so as to prevent the fruit mixture from adhering to its recipient during step (ii).

The fruit mixture of step (i) can also comprise at least one ingredient chosen from coloring agents, flavouring agents, flavors enhancers, vitamins, minerals, polyphenols, unsaturated fatty acids, and combinations thereof.

In step (i), the mixing can be performed at a temperature comprised between 30 and 100° C., preferably between 60 and 70° C., during 2 to 20 minutes, preferably 15 minutes.

Preferably, step (i) is performed under low agitation.

Step (ii) corresponds to an evaporation step. This evaporation step can be performed under vacuum or thanks to an osmotic process.

The temperature of step (ii) is comprised between 40° C. and 90° C., preferably between 50 and 70° C. preferably between 60 and 65° C. The pressure is comprised between 50 mbar and 1000 mbar, preferably between 90 mbar and 200 mbar, preferably between 95 mbar and 150 mbar. The heating under pressure is performed for a period of time comprised between 15 to 90 minutes, preferably between 50 and 65 minutes.

During this step, water present in the fruit pieces evaporates and is replaced by sugar thanks to an osmotic phenomenon. This phenomenon is, according to the invention, allowed under conditions that preserve the structural integrity of the fruit pieces. At the end of step (ii), we obtain a concentrated fruit preparation.

Step (iii) is optional and can be performed at other steps of the process, like after step (iv) for example. Preferably, it is performed between steps (ii) and (iv). It corresponds to a heat treatment of the concentrated fruit preparation. The heat treatment is performed at a temperature comprised between 90° C. and 120° C., preferably comprised between 90° C. and 100° C., preferably of around 95° C. According to an embodiment of the invention, the heat treatment is a pasteurization or a sterilization. Preferably, the heat treatment is a pasteurization at a temperature comprised between 90° C. and 100° C., preferably of around 95° C., during a time period comprised between 2 and 10 minutes, preferably comprised between 3 and 6 minutes.

Said heat treatment step is performed thanks to any material known in the art, like a double jacket tank under agitation.

Step (iv) is a cooling step of the concentrated fruit preparation obtained in step (ii), or, when step (iii) is performed, step (iv) is a cooling step of the concentrated fruit preparation obtained in step (iii). This cooling step can be performed according to any method known in the prior art, like cooling under vacuum or by allowing the preparation to cool at ambient temperature during a sufficient time period. By storage temperature, it is meant a temperature which allows storage of the fruit preparation. Classically, the storage temperature is comprised between 20° C. and 25° C. and corresponds to room temperature. It can also be comprised between 3° C. and 10° C., when the fruit preparation is stored as a fresh food product.

The concentrated fruit preparation obtained at the end of step (ii) has a Brix degree at 20° C. comprised between 50° and 75°, preferably comprised between 60° and 75°. The Brix degree of the concentrated fruit preparation obtained in step (ii) is not significantly different from the Brix degree of the fruit preparation obtained in step (iv).

The Brix degree corresponds to the sugar content of a preparation. It is measured as follows:

The fruit preparation is filtered on a sieve of 1 mm, and the supernatant (thus, without fruit pieces) is collected.

The refraction coefficient of the supernatant is measured, using a digital refractometer (Bellingham and Stanley refractometer with integral temperature probe, model RFM 340), preferably connected to a circulating water bath heated to 20° C. When the supernatant sample is at 20° C., the measure is done by placing the supernatant sample on the refractometer prism and reading the result.

According to an embodiment of the invention, after step (iv), the fruit preparation is pumped in order to fill containers at room temperature, i.e. a temperature comprised between 20° C. and 25° C., in particular 20° C.

Thanks to the process according to the present invention, the fruit preparation has a viscosity comprised between 5 to 15 cm/min and more particularly comprised between 7 to 14 cm/min at a temperature of 20° C., said viscosity being measured according to test A. The protocol for measuring viscosity (test A) is as follows:

The viscosity is measured thanks to a Bostwick (or Cenco) consistometer, sold by CFC Scientific. The measure is done on the fruit preparation, which is a uniform suspension, at 20° C. The fruit preparation is put on the cell. The chronometer starts when the cell is opened. The viscosity corresponds to the distance of the fruit preparation in one minute.

The fruit preparation obtained thanks to the process according to the invention can be usable as such, or added in admixture with other food preparations.

When the fruit preparation is usable alone as such, it can be used a topping on ice-creams, cakes or yogurts for example.

When added to other food preparations, it is particularly added to food preparations which are not heated, by simple mixture. Such food preparations can be chosen from dairy products, like milk, cream or fermented milk; vegetal products, like fermented fruit pieces, fermented fruit puree, fermented fruit juice or fermented vegetal juice. Milk can be whole or skimmed; in a liquid or concentrated form. It can also be cow milk, goat milk and/or sheep milk. Fermented milk includes yogurt, kefir and lassi. Preferably, the food preparations are yogurts.

EXAMPLES

Example 1

Viscosity and Fruit Recovery

A fruit preparation is prepared according to the invention and a standard fruit preparation is prepared by a standard process using thickening/gelling agents.

The fruit preparations according to the invention are prepared by the following process:
  (i) mixing the strawberry (respectively raspberry) pieces, in an amount of around 60% by weight, with 1% water and 40% sugar by weight relative to the total weight of the fruit preparation, so as to obtain a fruit mixture,
  (ii) treating the fruit mixture obtained in step (i) at a temperature of 65° C., and at a pressure of 100 mbar, during 60 minutes, so as to obtain a concentrated fruit preparation,
  (iii) submitting the concentrated fruit preparation obtained in step (ii) to a heat treatment, at a temperature of around 95° C. during 5 to 6 minutes,
  (iv) cooling the concentrated fruit preparation obtained in step (iii) to room temperature (around 20° C.).

The fruit preparations have a Brix degree at 20° C. comprised between 50° and 75°.

The standard fruit preparation is prepared by the following process:
  (i) mixing the strawberry (respectively raspberry) pieces (fruits pieces and optionally fruit matrix) in an amount of 50% by weight relative to the total weight of the fruit preparation, with 15% by weight water, 30% by weight sugar, 3% thickening/gelling agents and 2% additives (flavouring agents, regulator and coloring foodstuffs) by weight relative to the total weight of the fruit preparation, so as to obtain a fruit mixture,
  (ii) submitting the fruit mixture obtained in step (i) at a temperature of 92-95° C., and at a pressure of 1 bar, during 5-8 minutes, so as to obtain a concentrated fruit preparation,
  (iii) cooling the concentrated fruit preparation obtained in step (ii) until a temperature below 30° C.

The fruit preparation has a Brix degree at 20° C. around 50°.

The viscosity of the preparations is measured according to the protocol indicated in the description and expressed in Cenco unit, cm/min.

The fruit recovery of the two preparations is measured by means of 3 sieves of different sizes 1/5/8 mm, according to the following protocol:

The fruit preparation is washed by mixing it with water heated to 45° C.

It is drained in a static way on 3 sieves mounted on top of each other to determine the size distribution of fruit pieces.
Sieves 1 mm Total This measure is done thanks to a sieve of 1 mm. We dilute the fruit preparation (fruit prep) in water at 45° C., mix it and sieve it on the 1 mm sieve. The percentage of fruit retained on this sieve is calculated by [(weight of fruits retained on the sieve)−(fruit prep weight)]*100/[fruit prep weight].
Sieves 1; 5; 8 mm:

This measure is done thanks to 3 sieves of 1; 5; 8 mm. We dilute the fruit prep in water at 45° C., mix it and sieve it on the 3 sieves. The percentage of fruit retained on each sieve is calculated by [(weight of fruits retained on each sieve)−(fruit prep weight)]*100/[fruit prep weight].

The results are in the table below:

| | | Dosage fruit prep | Brix | Viscosity (cm/min) | % on 1 mm total | % on 1 mm | % on 5 mm | % on 8 mm |
|---|---|---|---|---|---|---|---|---|
| Strawberry | Evaporated prep | 13% | 67.9 | 11.5 | 36.1 | 11.1 | 16.9 | 11.9 |
| | Standard fruit prep | 18% | 50 | 7 | 18 | 13.8 | 4.2 | 0 |
| Raspberry | Evaporated prep | 13% | 66.5 | 8.7 | 29.1 | 21.7 | 5.63 | 5.13 |
| | Standard fruit prep | 18% | 50 | 7 | 17 | 16 | 1 | 0 |

Brix = Brix degree
Evaporated prep = fruit preparation according to the invention
Standard fruit prep = standard fruit preparation
Dosage fruit prep = % by weight of fruit pieces relative to the total weight of the fruit preparation The viscosities of the fruit preparations are comparable.

In each case, the fruit recovery in the fruit preparation according to the invention is equivalent to the standard fruit preparation.

However, analysis made on the strawberry preparation according to the invention shows that it contains more fruit pieces than the standard one: the number of fruit pieces per cup with sieving on 3 mm on a grid is around 18 for the fruit preparation according to the invention, whereas it is only 11 for the standard fruit preparation (experience done on 15 cups).

Example 2

Analysis of the Firmness of the Fruits a) The firmness of the fruits in the strawberry preparations according to Example 1 (i.e. invention and standard) is evaluated thanks to the following protocol:

The firmness of the fruit pieces is measured with a texturometer TAX-T2 sold by RHEO with a cell of 50 kg. The fruit preparation is sieved and the fruit pieces retained are put on a Kramer cell. The comb is placed at the entrance of the cell, and the maximal extrusion force is measured in Newton thanks to a speed of 80 mm/min and a deformation of 50 mm.

3 measurements are made, and the average corresponds to the final value.

The strawberry firmness in the standard fruit preparation is 40N, whereas the strawberry firmness in the fruit preparation of the invention is 140N.

Therefore, the firmness of the fruit pieces according to the invention is improved with a factor more than 3.

b) The impact of step (ii) of the process according to the invention (evaporation step) on fruit firmness is also evaluated.

2 compositions are prepared thanks to the following process:
- (i) mixing 45.6% of strawberry pieces of 10 mm with 40% sugar, 0.5% lemon juice, 10% strawberry concentrated puree and water, the % being by weight relative to the total weight of the fruit preparation;
- (ii) treating the fruit mixture obtained in step (i) at a temperature of 65° C., and at a pressure of 100 mbar, during 63 minutes, so as to obtain fruit preparation A, treating the fruit mixture obtained in step (i) at a temperature of 65° C., and at a pressure of 100 mbar, during 41 minutes, so as to obtain fruit preparation B,
- (iii) submitting the concentrated fruit preparation obtained in step (ii) to a pasteurization step, at a temperature of around 95° C., between 5 and 6 minutes,
- (iv) cooling under vacuum the concentrated fruit preparation obtained in step (ii) at a pressure of 100 mbar during 25 minutes, until a temperature of around 20° C.

Fruit preparation A has a Brix degree at 20° C. of 63.6°, and fruit preparation B has a Brix degree at 20° C. of 59°.

The firmness of fruit preparation A is 125N.

The firmness of fruit preparation B is 70N.

Therefore, the more the Brix degree increases and the evaporation factor is high, the more the fruit pieces are firm and resistant to further steps of the process, like a pasteurization step.

Thus, the quality of the finished product comprising the fruit preparation obtained thanks to the process of the invention is better in term of fruit recovery.

The invention claimed is:

1. A process for the preparation of a stable and homogenous fruit preparation in which neither a thickening agent nor a gelling agent has been added to confer a texture or viscosity to the preparation, which comprises the steps of:
- (i) preparing a fruit mixture by mixing fruit pieces, in the presence of between 2% and 70% of a fruit matrix selected from the group consisting of fruit puree, concentrated fruit puree and fruit compote, with sugar, said sugar being in an amount comprised between 10% and 60% by weight relative to the total weight of the fruit preparation, said preparation being totally free of any thickening agent and gelling agent,
- (ii) treating the fruit mixture obtained in step (i) at a temperature comprised between 40° C. and 90° C., and at a pressure from 95 mbar to 150 mbar, during 50 to 65 minutes, so as to obtain a concentrated fruit preparation, said concentrated fruit preparation having a Brix degree at 20° C. comprised between 50° and 75°,
- (iii) submitting the concentrated fruit preparation obtained in step (ii) to a heat treatment, at a temperature comprised between 95° C. and 120° C., and
- (iv) cooling the concentrated fruit preparation obtained in step (iii), to a storage temperature.

2. The process according to claim 1, wherein the fruit pieces are selected from the group consisting of strawberry, blackberry, apricot, peach, raspberry, blueberry, ananas, mango, banana, papaya, passion fruit, plum, pomelo, orange, kiwi, lemon, cherry, pear and apple.

3. The process according to claim 1, wherein the amount of fruit pieces is between 20% and 70% by weight of the fruit preparation.

4. The process according to claim 1, wherein in step (i), the mixing is performed at a temperature comprised between 30 and 100° C., during 2 to 20 minutes.

5. The process according to claim 1, wherein step (ii) uses a vacuum evaporation.

6. The process according to claim 1, wherein step (iii) is a pasteurization step.

7. The process according to claim 1, wherein the temperature of step (iii) is comprised between 95° C. and 100° C.

8. The process according to claim 1, wherein the viscosity of the fruit preparation is around 5 to 15 cm/min at a temperature of 20° C., said viscosity being measured according to test A, wherein according to test A:
- the viscosity of the fruit preparation, which is a uniform suspension, is measured using Bostwick consistometer at 20° C.,
- the fruit preparation is a placed into a cell of the Bostwick consistometer,
- a chronometer is started when the cell is opened, and
- the viscosity measured corresponds to the distance of the fruit preparation in one minute.

9. A stable and homogenous fruit preparation obtainable by the process as claimed in claim 1, wherein neither a thickening agent nor a gelling agent has been added to confer a texture of viscosity to said fruit preparation.

10. The fruit preparation according to claim 9, wherein the fruit preparation is usable as such, or added in admixture to other food preparations chosen from dairy products and vegetal products.

* * * * *